May 2, 1967 P. C. KESLING 3,316,640
METHOD OF MAKING A DENTAL APPLIANCE
Filed May 7, 1964 4 Sheets-Sheet 1

INVENTOR:
PETER C. KESLING
BY
Mayall, Johnston, Cook & Root
ATT'YS

May 2, 1967 P. C. KESLING 3,316,640
METHOD OF MAKING A DENTAL APPLIANCE
Filed May 7, 1964 4 Sheets-Sheet 2
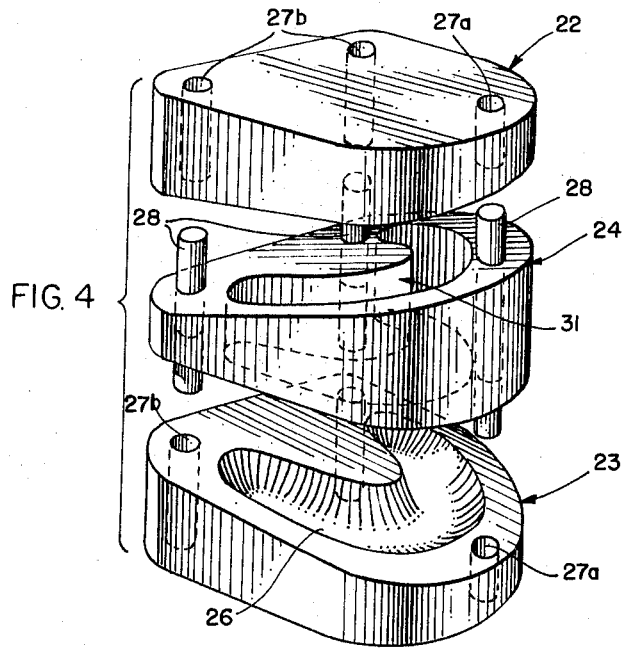
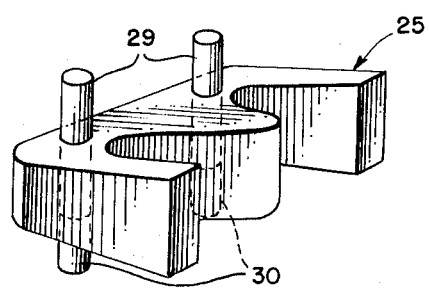
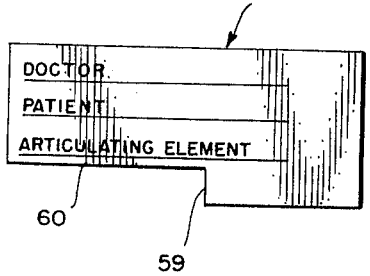
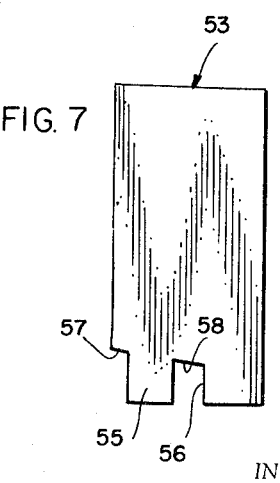
INVENTOR:
PETER C. KESLING
BY
Marjall, Johnston, Cook + Root
ATT'YS May 2, 1967 P. C. KESLING 3,316,640
METHOD OF MAKING A DENTAL APPLIANCE
Filed May 7, 1964 4 Sheets-Sheet 3

INVENTOR:
PETER C. KESLING
BY
ATT'YS

May 2, 1967  P. C. KESLING  3,316,640
METHOD OF MAKING A DENTAL APPLIANCE
Filed May 7, 1964  4 Sheets-Sheet 4

INVENTOR:
PETER C. KESLING
BY
Manzell, Johnston, Cook & Root
ATT'YS

United States Patent Office 3,316,640
Patented May 2, 1967

3,316,640
METHOD OF MAKING A DENTAL APPLIANCE
Peter C. Kesling, Green Acres, La Porte, Ind. 46350
Filed May 7, 1964, Ser. No. 365,717
11 Claims. (Cl. 32—14)

This invention relates in general to a method of making a dental appliance, and more particularly to a method of making a dental appliance for engagement with the teeth of a person to function as a protective device or to function as an orthodontic appliance for moving teeth of a person into a predetermined position.

Heretofore, methods have been developed for the making of dental appliances for the protection of teeth and the mouth, and appliances for moving teeth of a person into a predetermined position, the latter often being referred to as tooth positioning appliances. For example, Patents 2,467,432 and 2,775,036 were issued to Harold D. Kesling on Apr. 19, 1949, and Dec. 25, 1956, respectively, both of which related to methods for making tooth positioning appliances. And the method disclosed in the latter patent also relates to such a method utilizing a dental flask having an articulating element which is capable of making a tooth positioning appliance for a person having a normal or average freeway space about a normal hinge axis. While appliances made by this method have for many years been satisfactory and of a great value to the dental profession, there were instances where an appliance made by this method was not satisfactory due to the fact that the hinge axis of the individual was quite different than a normal hinge axis.

It is therefore an object of the present invention to provide an improved method of making a dental appliance worn in the mouth of a person as a protective device or as an orthodontic appliance for moving teeth to a predetermined position.

Another object of this invention is in the provision of a method of making a dental appliance to be worn in the mouth of a person, wherein the method involves consideration of the hinge axis of the person to thereby provide an appliance that will more accurately fit the mouth of the person.

Still another object of this invention resides in the provision of a method for making a dental appliance to be worn in the mouth of a person, wherein the method considers a representation of the teeth and hinge axis of the lower arch.

A further object of this invention is to provide a method of making a dental appliance comprising a resilient solid member having recesses shaped and located to the position of the teeth of a person, wherein the method involves consideration of a presentation of the relationship between the occlusal plane of the teeth of the lower arch and the hinge axis in order to provide an appliance custom designed for the mouth of the user.

A still further object of this invention resides in the provision of a method of making a tooth positioning appliance for moving teeth of a person into a predetermined position from cast models of the upper and lower arches having had the teeth thereon reset to a predetermined position and a graphic representation of the relationship between the teeth and hinge axis of the lower arch.

Another object of this invention is in the provision of a method of making a dental appliance from cast models of the upper and lower arches and a graphic representation of the relationship between the occlusal plane, hinge axis and most anterior lower incisor of the mandible, wherein this information is translated to a dental flask in mounting the upper and lower arches in separable upper and lower bases of the flask, and thereafter a resilient solid member having recesses shaped and located to the position of the teeth is made from the flask.

A still further object of this invention is to provide a method of making a tooth positioning appliance for moving teeth of a person into a predetermined position, whereby the method involves the use of a dental flask having upper and lower bases and an articulating element that is employed along with a hinge axis template for positioning and mounting the upper and lower arches in the bases in accordance with a hinge axis analysis made from a measurement taken directly from the patient or from a mandibular tracing of the person.

Other objects, features and advantages of the invention will be apparent from the following detailed disclosure, taken in conjunction with the accompanying sheets of drawings, wherein like reference numerals refer to like parts, in which:

FIG. 4 is an exploded perspective view of a type of dental flask that may be employed in the making of a dental appliance in accordance with the present invention;

FIG. 5 is a perspective view of an articulating element employed with the dental flask of FIG. 4;

FIG. 6 is a plan view of a part of the hinge axis template employed in the method of the present invention;

FIG. 7 is another part of the hinge axis template employed in the method of the present invention;

Figure 1:
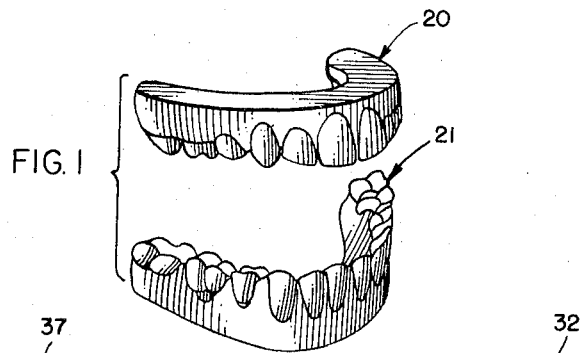
FIG. 1 is a perspective view of cast models of the upper and lower arches of a person.

The present invention relates to a method of making dental appliances either of the type referred to as protective mouthpieces or the type referred to as tooth positioning appliances. A protective mouthpiece is generally employed by an athlete for protection of the mouth and especially the teeth in engagement in athletic events. A tooth positioning appliance is generally employed in orthodontic treatment as a completion step to move the teeth into a predetermined ideal position such as indicated in the Harold D. Kesling Patent 2,531,222 granted on Nov. 21, 1950. In accordance with the previously mentioned Kesling Patent 2,775,036, the making of a tooth positioning appliance can be facilitated by the use of a dental flask that is capable of considering the articulation of the mandible. In the making of a dental appliance according to the present invention for use as a protective mouthpiece, cast models of the arches of a person are made pursuant to impressions taken of the teeth of the person. These arches are then mounted in the flask in accordance with the method of the present invention to ultimately make the appliance. Where a tooth positioning appliance is made, it is first necessary to reset the teeth on the arches to a predetermined position. This latter process is called the making of a "setup," and wherein cast models of the arches for use in the flask would be made from the setup and not directly from the impressions taken of the teeth of the person. The making of a setup is especially disclosed in the earliest Kesling Patent 2,467,432.

In order to practice the method of the present invention, it is also necessary to obtain a hinge axis analysis for use in mounting the arches in the separable bases of the flask to thereby obtain the making of an appliance most suitable to the mouth of a person and especially to the hinge axis of the person. More particularly, the hinge axis analysis would show the relationship between the occlusal plane and lower anteriormost incisor and the hinge axis of the mandible. This information may be obtained in any desirable manner, although it may be most easily obtained from a lateral headplate X-ray which is a common part of most orthodontic practices today. If the appliance is to complete orthodontic treatment, the X-ray should be one made at the conclusion of initial orthodontic treatment. From such an X-ray, a hinge axis analysis may easily be made by tracing the mandible as such will show the occlusal plane, the anteriormost incisor and the condyle. It is readily accepted that the center of the condyle as defined in a lateral headplate constitutes the hinge axis of the mandible.

With the mandibular tracing that constitutes a representation of the relationship between the teeth and the hinge axis, the arches are mounted in the dental flask so that the occlusal plane of the teeth and hinge axis are in the same relationships as found on the headplate. Thus, when the arches are opened slightly by the flask to obtain rest position, the lower arch is swinging through an arc around a center of rotation with each being related to the other and to the cranium as a whole exactly as depicted on the headplate. This results in the fabrication of a custom articulated dental appliance.

Referring now to the drawings and particularly to FIG. 1, a set of cast models of arches is shown wherein the upper arch is designated by the numeral 20 and the lower arch by the numeral 21. These cast models may be made of any suitable material such as a dental plaster, and preferably of one that is relatively hard such as that referred to in the profession as "stone." Further, these cast models would be prepared pursuant to impressions taken in the mouth of a person, and where it is desired to make a protective mouthpiece, the models would be made directly from the impressions. Where it is desired to make a tooth positioning appliance, the cast models would have been made from impressions taken of a setup. As already explained, a setup comprises a cast model of the teeth wherein the teeth have been reset to a predetermined ideal position.

While any desirable type of dental flask may be employed in the making of the dental appliance in accordance with the method of the present invention, one such type is illustrated particularly in FIGS. 4 and 5, wherein the dental flask includes an upper base 22, a lower base 23 and identical to the upper base, a center section 24 and an articulating element 25. The upper and lower bases are each provided with a U-shaped trough 26 into which is mounted the respective arch. The bases 22 and 23 are provided with a plurality of vertically extending holes including a front hole 27a and rear holes 27b that are adapted to receive in close fitting relationship pins 28 provided in the center section 24. It may be noted that the pins extend upwardly and downwardly of the center section. Further, the two rearmost openings or holes 27b of the bases are adapted to respectively receive the upper and lower pins 29 and 30 of the articulating element 25. While the pins 28 essentially extend clear through the center section 24 and therefore provide pin portions at the upper and lower sides in axial alignment, the pins 29 and 30 of the articulating element 25 are angularly related to each other in order to facilitate the mounting of the arches in the troughs 26 of the bases. Further, the vertical thickness of the articulating element 25 is different than the vertical thickness of the center section 24 and such as to properly permit the mounting of the arches and the bases.

The center section 24 is further provided with a vertically extending U-shaped opening 31 that receives the material to be molded for making of the dental appliance, and which material is preferably resilient and most preferably rubber. A more detailed explanation of a type of dental flask to be employed may be found in the Kesling Patent 2,775,036.

While the dental flask illustrated in FIGS 4 and 5 provides circular pins and openings and three in number in triangular arrangement, it should be appreciated that pins of any desirable size and configuration and any desirable number may be employed. Further, other variations in the shape and structure of the bases, center section and articulating element may be provided. It is to be understood that the present invention is not limited to any particular type of dental flask other than one which includes separable upper and lower bases, a center section and an articulating element. The flask may be made of any suitable material, but preferably of a hard material.

Figure 2:
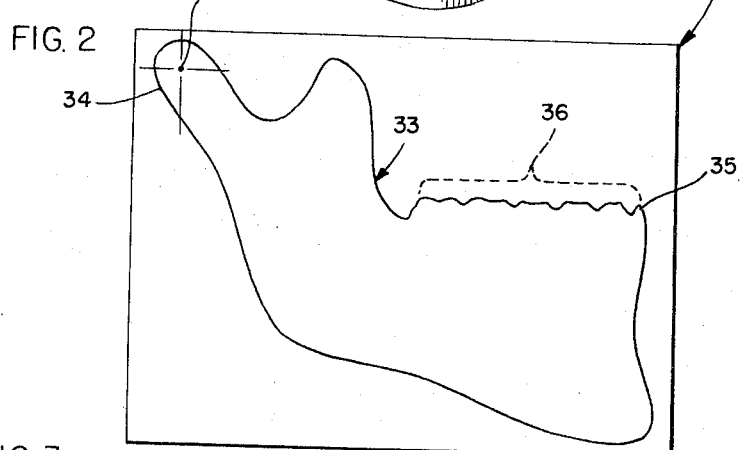
FIG. 2 is a mandibular tracing of a person.
Figure 3:
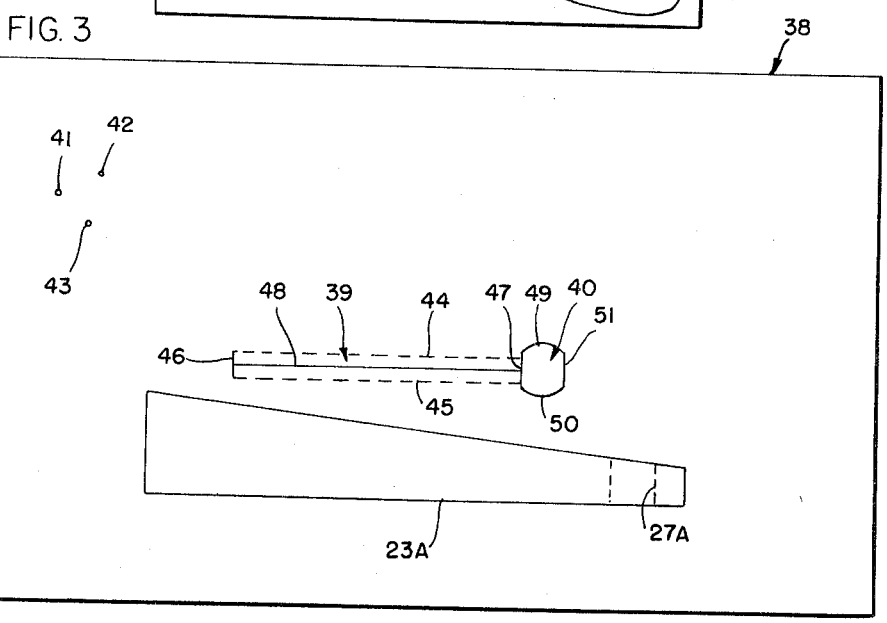
FIG. 3 is a master articulating element template layout empoyed in the method of the present invention for translating the hinge axis analysis of a person to the dental flask in the making of a dental appliance.

Referring particularly to FIG. 2, a sheet of translucent or transparent material 32 is shown that includes thereon a mandibular tracing 33. While the sheet 32 may arches the flask bases effectively constitutes the use of tracing paper works out very well. The mandibular tracing 33 represents the mandible of a person and this can best be obtained by arranging the tracing sheet 32 over a lateral headplate X-ray so that the manible can be appropriately traced. Particularly, it is important to record the relationship between the condyle 34, the anteriormost incisor 35 and the occlusal plane 36. The center of the condyle 34 is considered the hinge axis, and is indicated by the numeral 37. As already explained, a graphic representation of the relationship between the hinge axis, the occlusal plane and the anteriormost incisor is necessary to carry out the method of making the dental appliance of the present invention, and this representation may be obtained by any other suitable means. Further this relationship may be referred to as the hinge axis analysis.

In order to translate the hinge axis analysis to the flask, a master articulating element template layout 38 is employed which permits the making of a hinge axis template and the determination of the size of articulating element to be used for any particular case. The layout includes thereon a side elevational view of the lower base as indicated by the numeral 23A that corresponds to the side elevational view of a base 23 with the forward opening or hole represented by the numeral 27A that corresponds to the front hole 27a of the base. Positioned above the representation of the flask base is an elongated occlusal plane zone 39 and an anteriormost incisor zone 40. And in the upper lefthand corner of the layout are, in this instance, three hinge axis points 41, 42 and 43 that relate to the articulating element size to be used for any one case.

The occlusal plane zone 39 is bounded by parallel upper and lower dotted lines 44 and 45, and opposed end parallel lines 46 and 47. The solid line extending longitudinally through the center of the zone 39 and designated by the numeral 48 represents the center of the zone.

The anteriormost incisor zone is bounded by upper and lower arcuate lines 49 and 50, the end line 47 on one side and an end line 51 on the other side paralleling line 47. The zones 39 and 40 and the hinge axis points 41, 42 and 43 are established based upon the lower flask base and its cavity that receives the lower arch, and the articulating elements in accordance with an accepted type of dental articulation, whereby mounting of the arches in the flask bases effectively constitutes the use of an articulator. Moreover, it can be said that the flask with its bases, center section and articulating element are in the form of an articulator.

Figure 8:
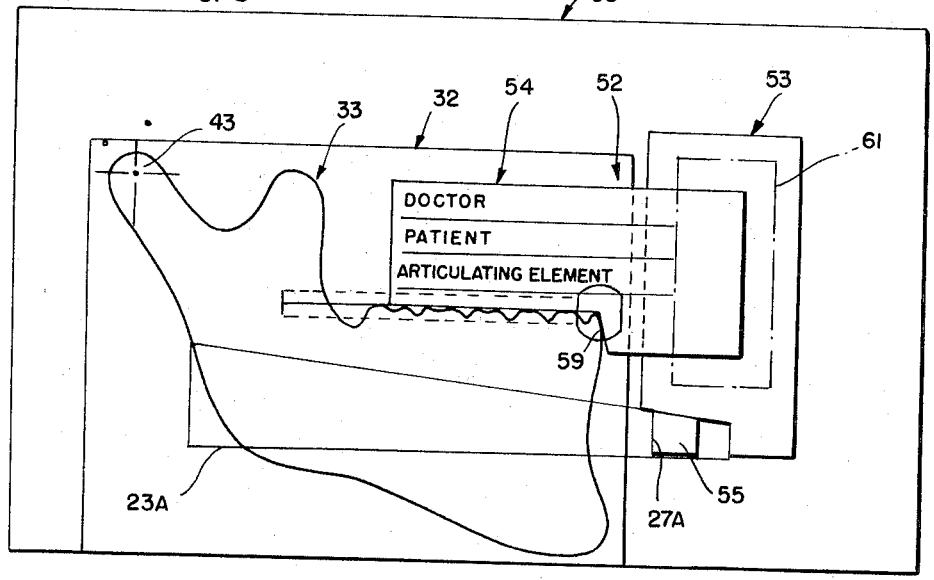
FIG. 8 is a representation of the use of the master articulating element template layout of FIG. 3 and showing the making of the hinge axis template.

With the sheet of tracing material 32 having the mandibular tracing 33 thereon, the step of translating this hinge axis analysis to the flask is accomplished by laying the tracing over the master articulating element template layout 38 as shown in FIG. 8 so that the occlusal plane 36 falls within the occlusal plane zone 39 and the anteriormost incisor zone 40 and the hinge axis 37 falls on one of the hinge axis points 41, 42 and 43. Depending upon the size of the mandibular, the finding will be that only one of the hinge axis points will provide the most centrally positioning of the occlusal plane and anteriormost incisor in the zones 39 and 40. An attempt is made to centrally position the anteriormost incisor in the zone 40 while at the same time arranging the occlusal plane as close as possible along the occlusal line 48 in the zone 39, while at the same time superposing the center of the condyle or the hinge axis of the mandible on one of the hinge axis points. From this will be ascertained as to which size articulating element should be employed, and in accordance with the illustration of FIG. 8, it would be the articulating element corresponding to the hinge axis point 43.

Then the hinge axis template 52 is constructed which includes template sections 53 and 54.

The template section 53 used in each case is identical, and therefore is preferably made of a reusable and wearable material such as plastic sheet, while the template section 54 may be only used for any particular case and therefore is preferably of heavy paper or cardboard. However the materials used for the template sections may be of any desirable substance. As seen particularly in FIG. 7, the template section 53 is generally rectangular in shape and provided with a lower leg 55 adapted to be intimately received in the forward opening 27A of the lower flask base 23. A notch 56 is provided adjacent the leg 55 to receive the forwardmost portion of the base, while edges 57 and 58 are arranged to engage the upper face of the flask base and to bottom the template section 53 thereon.

The template section 54 is also generally rectangular in shape and notched in the lower left corner to generally define an incisor engaging face 59 and an occlusal plate face 60.

Following the proper location of the mandibular tracing on the layout, a template section 53 is positioned over the layout so that the leg 55 is received within the template positioning hole 27A of the base 23A and so that the edges 57 and 58 coincide with the upper face of the base. Then a template section 54 is placed over the layout and the tracing so that the occulusal plane face lies contiguous with an occlusal plane of the teeth as represented by the tracing, and so that the incisor engaging face 59 lies substantially contiguous with the labial edge of the anteriormost incisor. Inasmuch as the anteriormost incisor may not always present a vertical face, the incisor engaging face 59 of the template section 54 may be suitably trimmed for the best fit. For example, the incisor engaging face 59 in the illustrated embodiments of FIGS. 8 and 9 has been trimmed to provide an inclined face for best fitting against the outline of the anteriormost incisor.

After the template section 54 has been properly positioned and trimmed if necessary, this section is then removably secured to the template section 53 by means of a piece of suitable tape 61. With the template sections 53 and 54 secured together, the hinge axis template 52 is complete. For convenience, the articulating element size for a particular case is registered on the template section 54 so that the proper articulating element is employed in mounting the arches in the flask bases.

Figure 9:
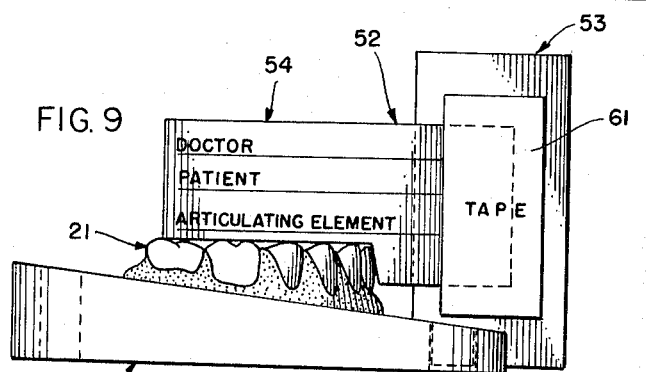
FIG. 9 illustrates the use of the hinge axis template in accordance with the method of the present invention in properly positioning the lower arch in the lower base of the flask in showing the base and template in side elevational view.
Figure 10:
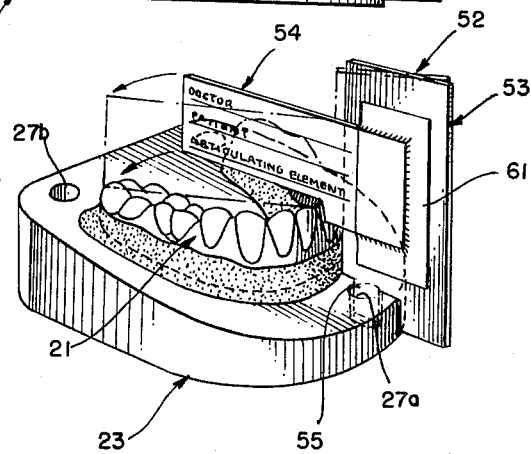
FIG. 10 is a perspective view of the base and template of FIG. 9 and illustrating the more complete utilization of the template in positioning of the lower arch in the lower base.
Figure 11:
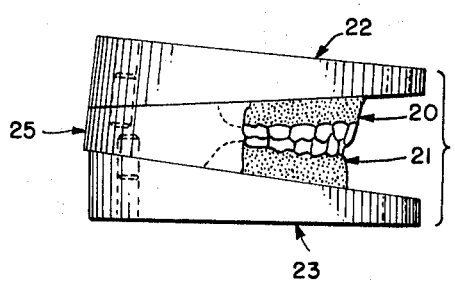
FIG. 11 is a side elevational view of the assembled upper and lower bases of the dental flask with the articulating element and showing the position of the arches, all in side elevational view.

The hinge axis template 52 is then employed for mounting the lower arch 21 in the lower base 23. While the lower arch 21 may be reproduced in any suitable manner in the base 23, it is preferable that it be made as shown in FIG. 1 and then be arranged to be mounted in the U-shaped trough or cavity 26 by first placing an amount of soft plaster or stone in the cavity and then positioning the arch in the soft stone. The hinge axis template 52 is then mounted on the base 23 as shown in FIGS. 9 and 10 while the lower arch 21 is brought into position to conform the occlusal plane with the occlusal plane face 60, and the incisal edge with the incisor engaging face 50. The hinge axis template 52 may be swung from one side of the base to the other to assure that the occlusal plane of the lower arch is in proper position on each side. Thereafter the soft stone is allowed to harden to securely mount the lower arch 21 in the lower base 23.

Figure 12:
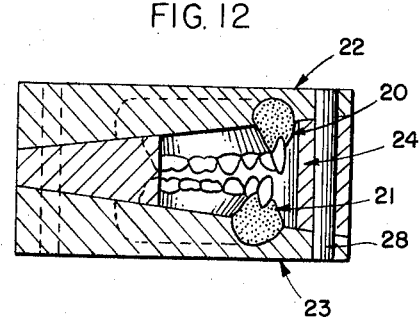
FIG. 12 is a longitudinal sectional view taken through the dental flask and illustrating the freeway spacing between the teeth for application to the dental appliance.
Figure 13:
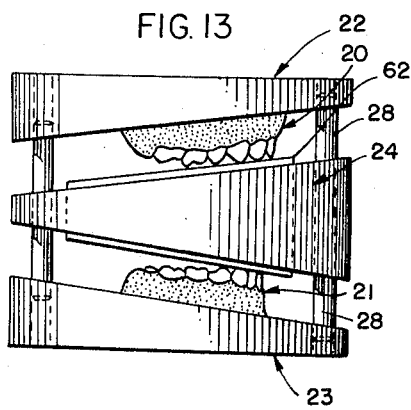
FIG. 13 is a side elevational view illustrating the manner of utilizing the center section of the flask in the making of the dental appliance and how the upper and lower bases are advanced to form impressions in the resilient material held by the center section.
Figure 14:
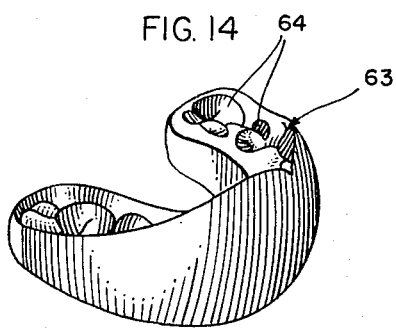
FIG. 14 is a perspective view of a dental appliance made in accordance with the present invention.

The next step involves the mounting of the upper arch 20 in the upper base 22, wherein the upper arch 20 is placed in occlusal relation with the lower arch 21, the articulating element 25 is mounted on the lower base 23, soft stone is poured into the cavity of the upper base 22, and the upper base 22 is placed in position on the articulating element 25 wherein the upper arch 20 engages in the soft stone. When the stone has hardened in the upper base to securely fasten the upper arch 20 thereto, the articulating element 25 is removed and the center section 24 is loaded with a supply of rubber 62 or resilient material out of which the dental appliance is to be made as shown in FIG. 13. With the upper and lower bases 22 and 23 disposed on opposite sides of the center section 24, heat and/or pressure is applied to the bases until the upper and lower arches 20 and 21 are advanced into the molding material 62 and until the upper and lower bases contact the center section 24. At this time, the recesses for the teeth will be properly shaped and located and so that a freeway spacing is effected between the upper and lower arches as illustrated in the showing of FIG. 12. The molding material is then cured by heat. It will be appreciated that the center section 24 coacts with the bases and the articulating element 25 in order to provide the freeway spacing between the arches. A completed dental appliance, generally indicated by the numeral 63, whether this be a protective device or a tooth positioning appliance, will have recesses as indicated by the numeral 64 for receiving the teeth of a person. It should be understood that the appliance 63 will have been suitably conditioned and formed subsequent to removal of same from the flask upon its formation.

From the foregoing, it is seen that the method of the present invention provides for the construction of a custom articulated appliance fabricated in accordance with the true hinge axis relationship of a person securing same.

It will be understood that modifications and variations may be effected without departing from the scope of the novel concepts of the present invention, but it is understood that this application is to be limited only by the scope of the appended claims.

The invention is hereby claimed as follows:

1. A method of making an appliance for use on the teeth of a person from cast models of the upper and lower arches of that persons and a means representing the relationship between the teeth and hinge axis of the lower arch of that person, said method comprising the steps of reproducing said models in separable upper and lower bases of a flask in accordance with the cast models of that person and said means representing the relationship between the teeth and hinge axis of the lower arch of that person, establishing a position of said upper and lower arches as reproduced in said bases simulating a relaxed slightly opened position of the arches based upon said representation means of that person, and making a resilient solid member therefrom having recesses shaped and located to the position of the teeth.

2. A method of making a tooth positioning appliance for moving teeth of a person into a predetermined position from cast models of the upper and lower arches of that person having had the teeth thereon reset to said predetermined position and from a means representing the relationship between the teeth and hinge axis of the lower arch of that person, said method comprising the steps of reproducing the models of the arches of that person in separable upper and lower bases of a flask in accordance with said means representing the relationship between the teeth and hinge axis of the lower arch of that person and establishing a relaxed slightly opened position of the arches based upon the representation means of the relationship between the teeth and hinge axis of the lower arch of that person, disposing resilient deformable material between said upper and lower arches as reproduced in said bases when the arches are spaced apart to receive same, and returning said upper and lower arches in said bases to the established relationship and relaxed position to form permanent impressions of the upper and lower teeth in said material to provide a tooth positioning appliance.

3. A method of making an appliance for use on the teeth of a person from cast models of the upper and lower arches of the person and a representation of the relationship between the teeth and hinge axis of the lower arch, said method comprising the steps of making a template in accordance with said relationship, applying said template to the lower base of a flask, mounting the lower arch in the lower base in accordance with said template, mounting the upper arch in the upper base of the flask in accordance with the position of the lower arch in the lower base and the established simulated relaxed opened position of the arches, disposing resilient deformable material between said upper and lower arches when they are spaced apart to receive same, and returning said upper and lower arches to the established relationship and relaxed position to form permanent impressions of said upper and lower teeth in said material.

4. A method of making an appliance for use on the teeth of a person from cast models of the upper and lower arches of the person and a representation of the relationship between the teeth and hinge-axis of the lower arch, said method comprising the steps of making a hinge-axis template in accordance with said relationship, applying said template to the lower base of a flask, mounting the lower arch in the lower base in accordance with said template, positioning said upper arch in occluded relation to the lower arch, mounting an articulating element on said lower base in accordance with said relationship, mounting the upper base on the articulating element so as to thereby mount the upper arch in the upper base, disposing resilient deformable material between said upper and lower arches spaced apart to receive it, and returning said upper and lower teeth to the established relationship and relaxed position forming permanent impressions of said upper and lower teeth in said material.

5. A method of making an appliance for use on the teeth of a person from cast models of the upper and lower arches of the person and a representation of the relationship between the teeth and hinge-axis of the lower arch, said method comprising the steps of making a hinge-axis template and determining the size of articulating element needed to mount the arches in a flask by applying the representation to a master articulating element template layout, applying the template to the lower base of a flask having separable upper and lower bases and mounting of the lower arch therein in accordance with said template, mounting the articulating element between the upper and lower bases of the flask, mounting the upper arch in the upper base in accordance with the position of the lower arch in the lower base, removing said articulating element from between the bases, and making a resilient solid member therefrom having recesses shaped and located to the position of said teeth.

6. A method of making an appliance for use on the teeth of a person from cast models of the upper and lower arches of the person and a representation of the relationship between the teeth and hinge-axis of the lower arch, said method comprising the steps of making a hinge-axis template and determining the size of articulating element needed to mount the arches in a flask by applying the representation to a master articulating element template layout, applying the template to the lower base of a flask having separable upper and lower bases and mounting of the lower arch therein in accordance with said template, mounting the articulating element between the upper and lower bases of the flask, mounting the upper arch in the upper base in accordance with the position of the lower arch in the lower base, removing said articulating element from between the bases, establishing a position of the upper and lower arches simulating the relaxed slightly opened position of the teeth by disposing a central element between said bases, disposing resilient deformable material between said upper and lower arches spaced apart to receive it, and returning said upper and lower teeth to the relaxed position forming permanent impressions of said upper and lower teeth in said material.

7. A method of making an appliance for use on the teeth of a person from cast models of the upper and lower arches of the person and a mandibular tracing, said method comprising the steps of making a hinge-axis template from said tracing as applied to a master articulating element template layout, mounting said template on the lower base of a flask having separable upper and lower bases, positioning and mounting the lower arch in the lower base in accordance with said template, mounting an articulating element on the lower base as determined by the layout, placing the upper arch in occlusal relation with the lower arch, mounting the upper base on said articulating element to thereby mount the upper arch in the upper base, and making a resilient member therefrom having recesses shaped and located to the position of the teeth.

8. A method of making a tooth positioning appliance for moving teeth of a person into a predetermined position from cast models of the upper and lower arches having had the teeth thereon reset to said predetermined position and a representation of the relationship between the teeth and hinge-axis of the lower arch of the person, said method comprising the steps of making a hinge-axis template and determining the size of articulating element needed to mount the arches in a flask by applying the representation to a master articulating element template layout, applying the template to the lower base of a flask having separable upper and lower bases and mounting of the lower arch therein in accordance with said template, mounting the articulating element between the upper and lower bases of the flask, mounting the upper arch in the upper base in accordance with the position of the lower arch in the lower base, removing said articulating element from between the bases, and making a resilient solid member therefrom having recesses shaped and located to said predetermined position of the teeth.

9. A method of making a tooth positioning appliance for moving teeth of a person into a predetermined position from cast models of the upper and lower arches having had the teeth thereon reset to said predetermined position and a representation of the relationship between the teeth and hinge-axis of the lower arch of the person, said method comprising the steps of making a hinge-axis template and determining the size of articulating element needed to mount the arches in a flask by applying the representation to a master articulating element template layout, applying the template to the lower base of a flask having separable upper and lower bases and mounting of the lower arch therein in accordance with said template, mounting the articulating element between the upper and lower bases of the flask, mounting the upper arch in the upper base in accordance with the position of the lower arch in the lower base, removing said articulating element from between the bases, establishing a position of the upper and lower arches simulating the relaxed slightly opened position of the teeth by disposing a central element between said bases, disposing resilient deformable material between said upper and lower arches spaced apart to receive it, and returning said upper and lower teeth to the established relationship and relaxed position forming permanent impressions of said upper and lower teeth in said material to provide a tooth positioning appliance.

10. A method of making a tooth positioning appliance for moving teeth of a person into a predetermined position from cast models of the upper and lower arches having had the teeth thereon reset to said predetermined position and a mandibular tracing showing the relationship between the hinge axis, occlusal plane and anteriormost incisor, said method comprising the steps of applying the tracing to a master articulating element template layout having hinge axis points, zones for the occlusal plane and the anteriormost incisor, and a representation of the lower base of a flask having separable upper and lower bases, making a hinge axis template from the relationship of the tracing to the layout and determining the size of articulating element to use in mounting the arches in the bases, mounting the arches in the bases in accordance with the hinge axis template and the articulating element, and making a resilient solid member therefrom having recesses shaped and located to said predetermined position of the teeth.

11. A method of making a tooth positioning appliance for moving teeth of a person into a predetermined position from cast models of the upper and lower arches having had the teeth thereon reset to said predetermined position and a mandibular tracing showing the relationship between the hinge axis, occlusal plane and anteriormost incisor, said method comprising the steps of applying the tracing to a master articulating element template layout having hinge axis points, zones for the occlusal plane and the anteriormost incisor, and a representation of the lower base of a flask having separable upper and lower bases, making a hinge axis template from the relationship of the tracing to the layout and determining the size of articulating element to use in mounting the arches in the bases, mounting the arches in the bases in accordance with the hinge axis template and the articulating element, and making a resilient solid member therefrom having recesses shaped and located to said predetermined position of the teeth.

References Cited by the Examiner
UNITED STATES PATENTS

| | | | |
|---|---|---|---|
| 2,531,222 | 11/1950 | Kesling | 32—14 |
| 2,775,036 | 12/1956 | Kesling | 32—14 |

RICHARD A. GAUDET, *Primary Examiner.*

J. W. HINEY, *Assistant Examiner.*